Aug. 4, 1931.  C. A. UPSON ET AL  1,817,113
CUTTING AND SWATCHING MECHANISM
Filed April 15, 1930  5 Sheets-Sheet 1
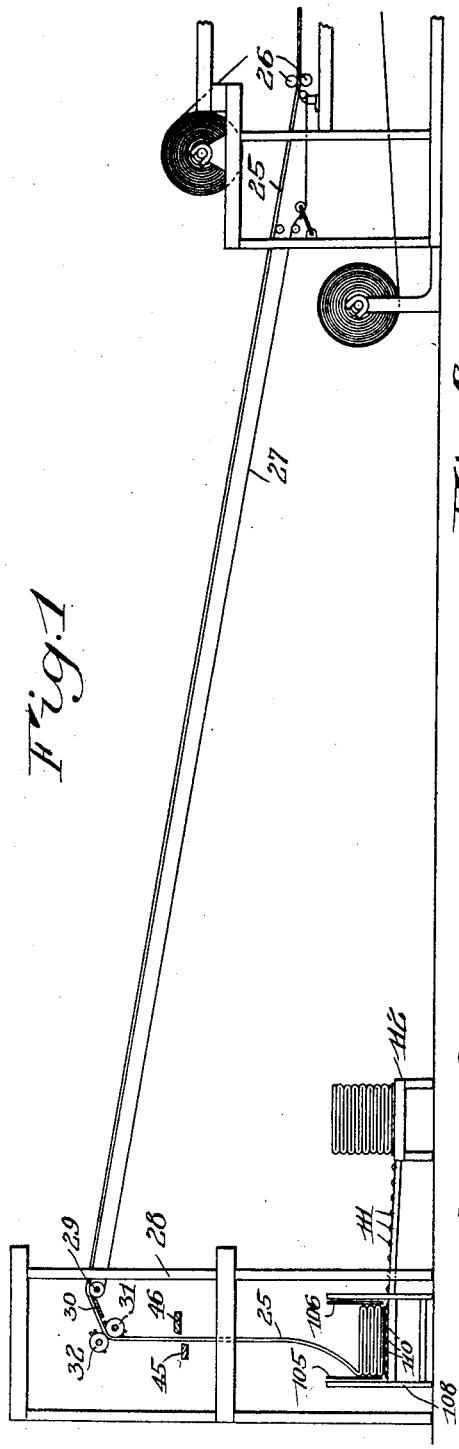
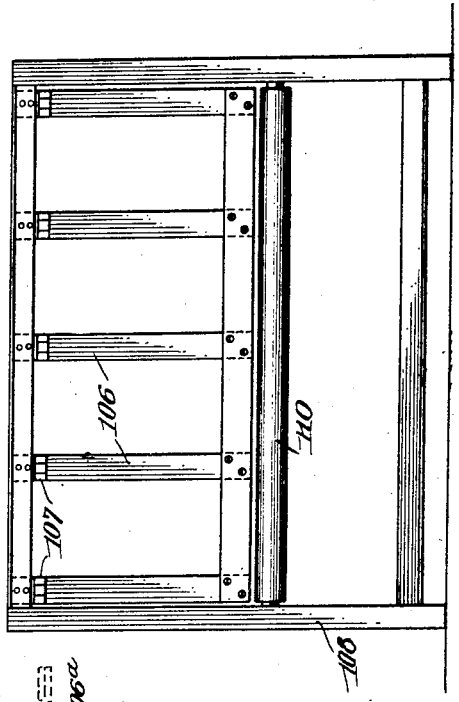
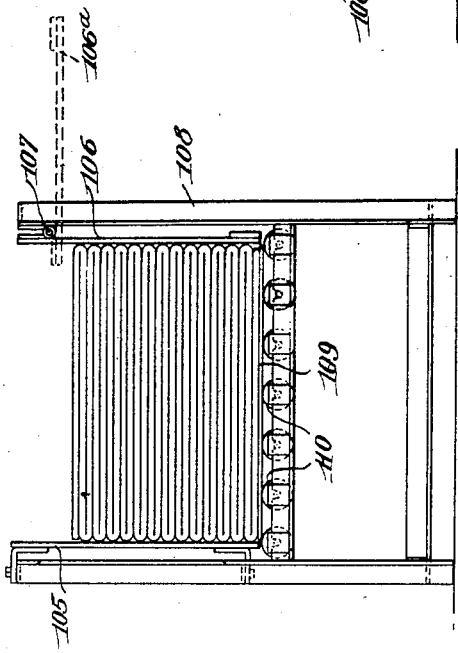
INVENTORS
Charles A. Upson
BY Otto R. Winter
Edward H. Cumpston
their ATTORNEY Aug. 4, 1931.   C. A. UPSON ET AL   1,817,113
CUTTING AND SWATCHING MECHANISM
Filed April 15, 1930   5 Sheets-Sheet 3
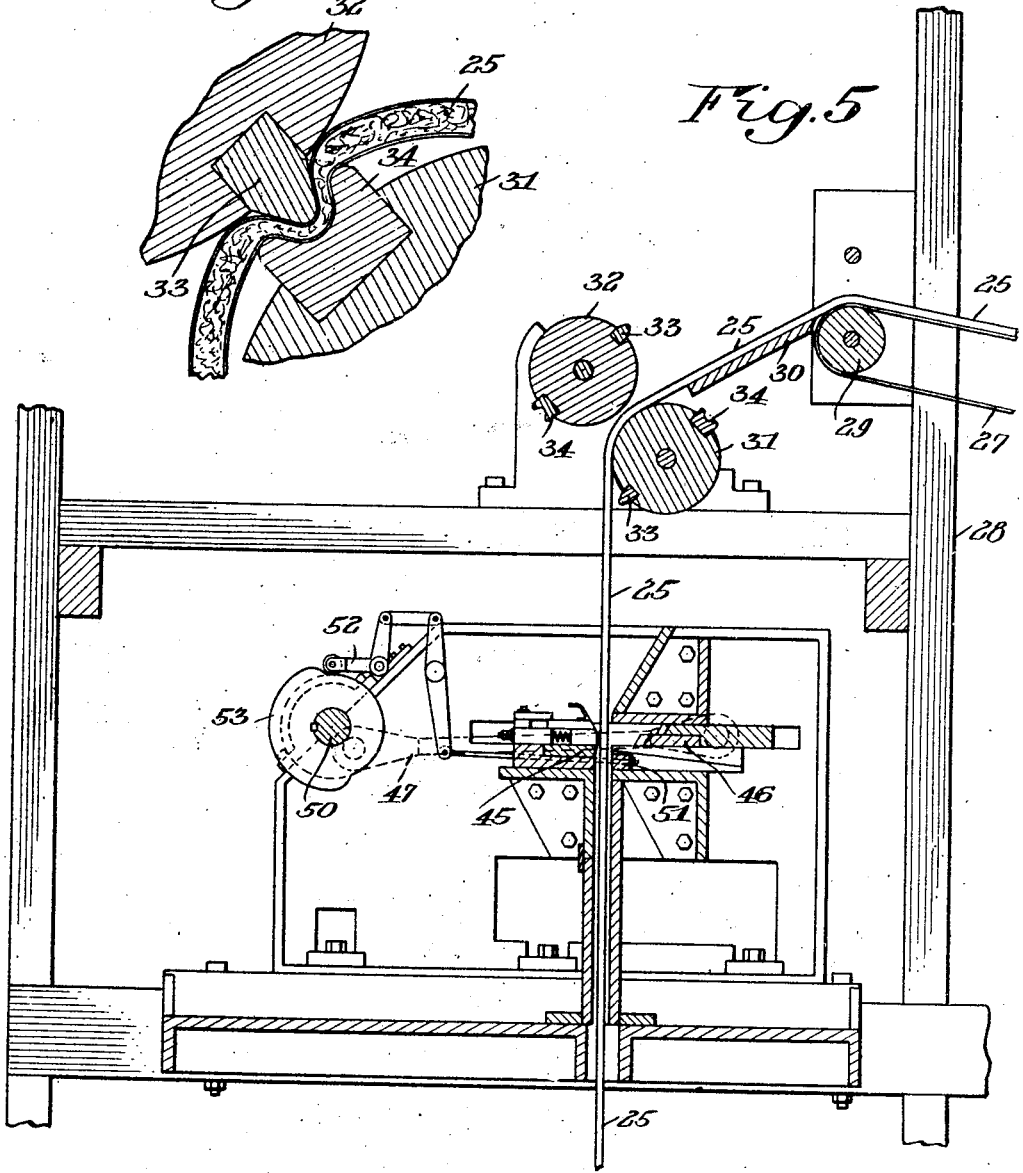
INVENTORS
Charles A. Upson
BY Otto R. Winter
Edward H. Dumpren
their ATTORNEY Aug. 4, 1931.  C. A. UPSON ET AL  1,817,113
CUTTING AND SWATCHING MECHANISM
Filed April 15, 1930   5 Sheets-Sheet 4
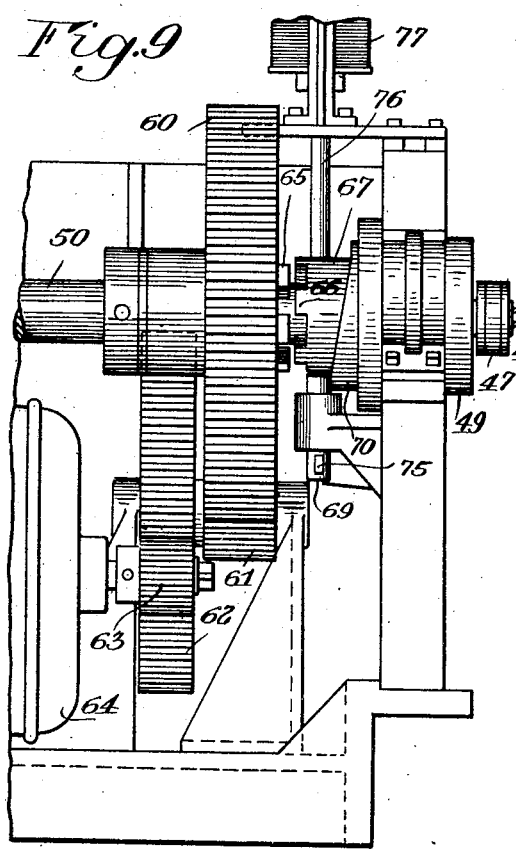
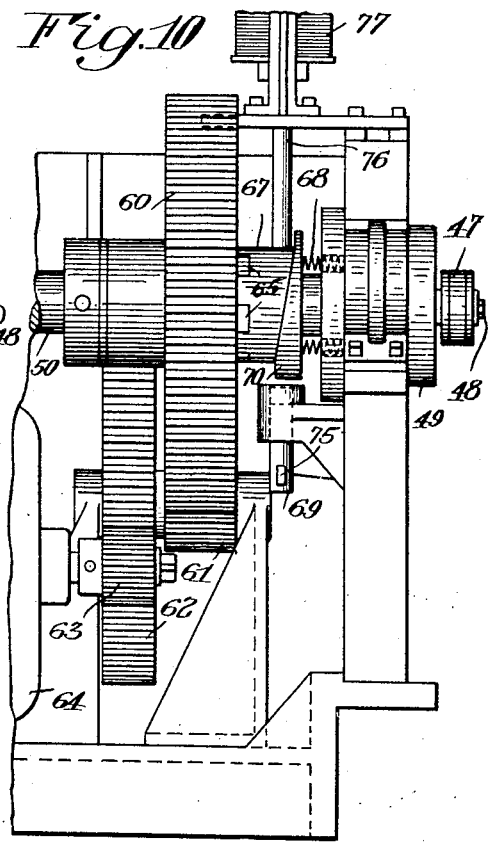
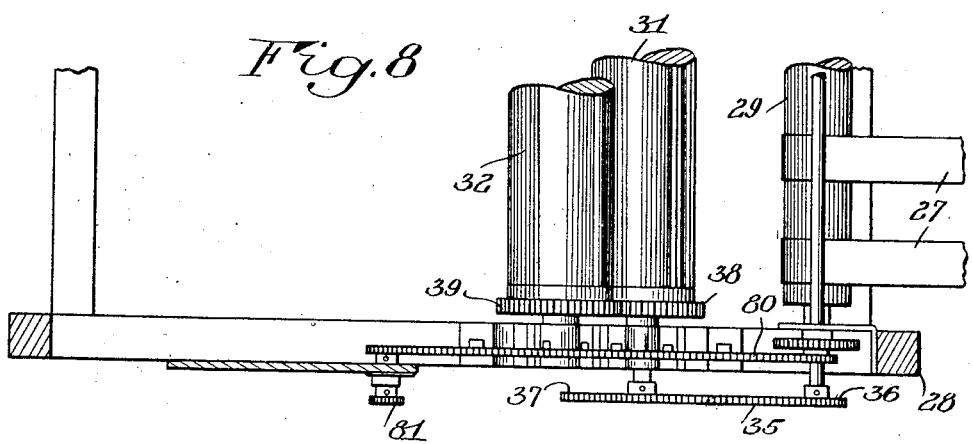

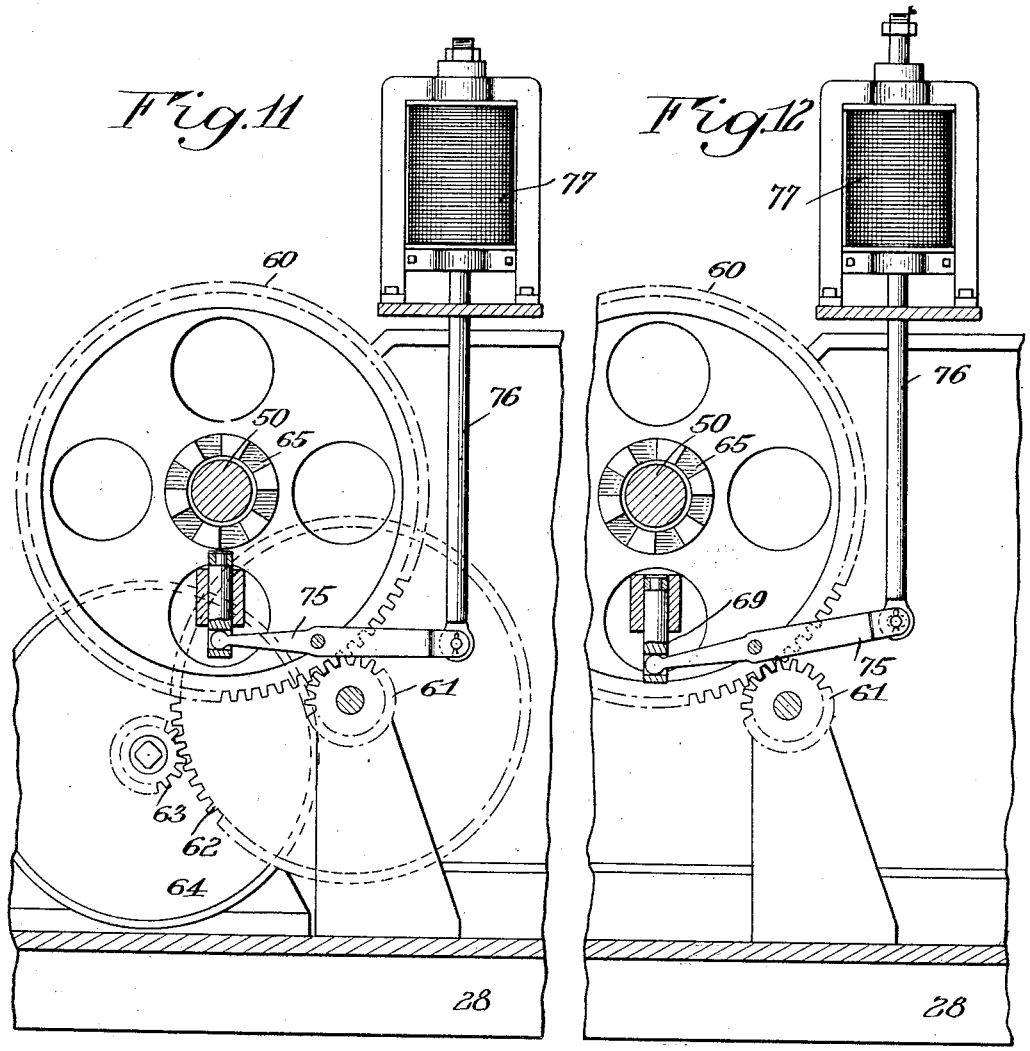
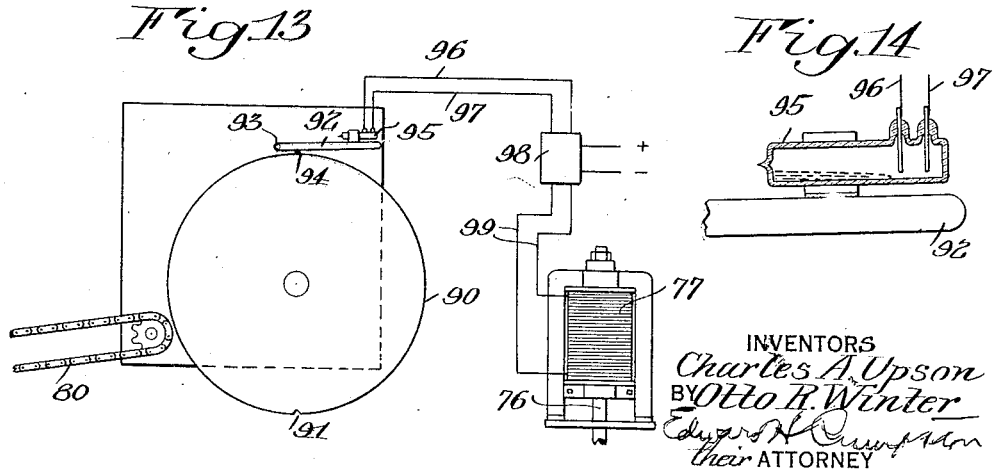

Patented Aug. 4, 1931

1,817,113

UNITED STATES PATENT OFFICE

CHARLES A. UPSON, OF LOCKPORT, NEW YORK, AND OTTO R. WINTER, OF CINCINNATI, OHIO, ASSIGNORS TO THE UPSON COMPANY, OF LOCKPORT, NEW YORK, A CORPORATION OF NEW YORK

CUTTING AND SWATCHING MECHANISM

Application filed April 15, 1930. Serial No. 444,555.

This invention relates to mechanism for cutting and swatching a strip of insulating batting in order that such batting may be put up in convenient packages for easy transportation and handling. An object of the invention is to provide generally improved and efficient mechanism of this character, which is more satisfactory in use than the mechanisms previously known.

Another object is to provide satisfactory mechanism for cutting a strip of insulating batting into definite and preferably uniform lengths.

A further object is the provision of improved guiding means for the insulating material while it is being swatched, and of mechanism so designed that the swatched material may be removed quickly from the guiding means when the swatching of a length is completed, to make way for the swatching of the next succeeding length of material.

To these and other ends the invention resides in certain improvements and combinations of parts, all as will be hereinafter more fully described, the novel features being pointed out in the claims at the end of the specification.

In the drawings:

Fig. 1 is a diagrammatic side elevation of apparatus constructed in accordance with a preferred embodiment of the invention;

Fig. 2 is a side elevation on a larger scale of guide means for the insulating batting while it is being swatched;

Fig. 3 is a front elevation of such guide means;

Fig. 5 is a vertical section through the apparatus shown in Fig. 4;

Fig. 6 is a detailed view of a portion of the creasing rolls;

Fig. 7 is a transverse section through a strip of insulating batting of the kind operated upon by the present mechanism;

Fig. 8 is a plan, with parts in section, of the drive for the creasing rolls and for the timing device of the severing mechanism;

Fig. 9 is a fragmentary elevation of parts of the severing mechanism with the clutch in open position;

Fig. 10 is a similar view with the clutch closed;

Fig. 11 is a transverse section through parts of the severing mechanism with the clutch open, corresponding to Fig. 9;

Fig. 12 is a similar view with the clutch closed, corresponding to Fig. 10;

Fig. 13 is a detail of the timing device for operating the clutch of the severing mechanism; and Fig. 14 is a detail of a mercury switch used in this timing device.

Similar reference numerals throughout the several views indicate the same parts.

Figure 4:
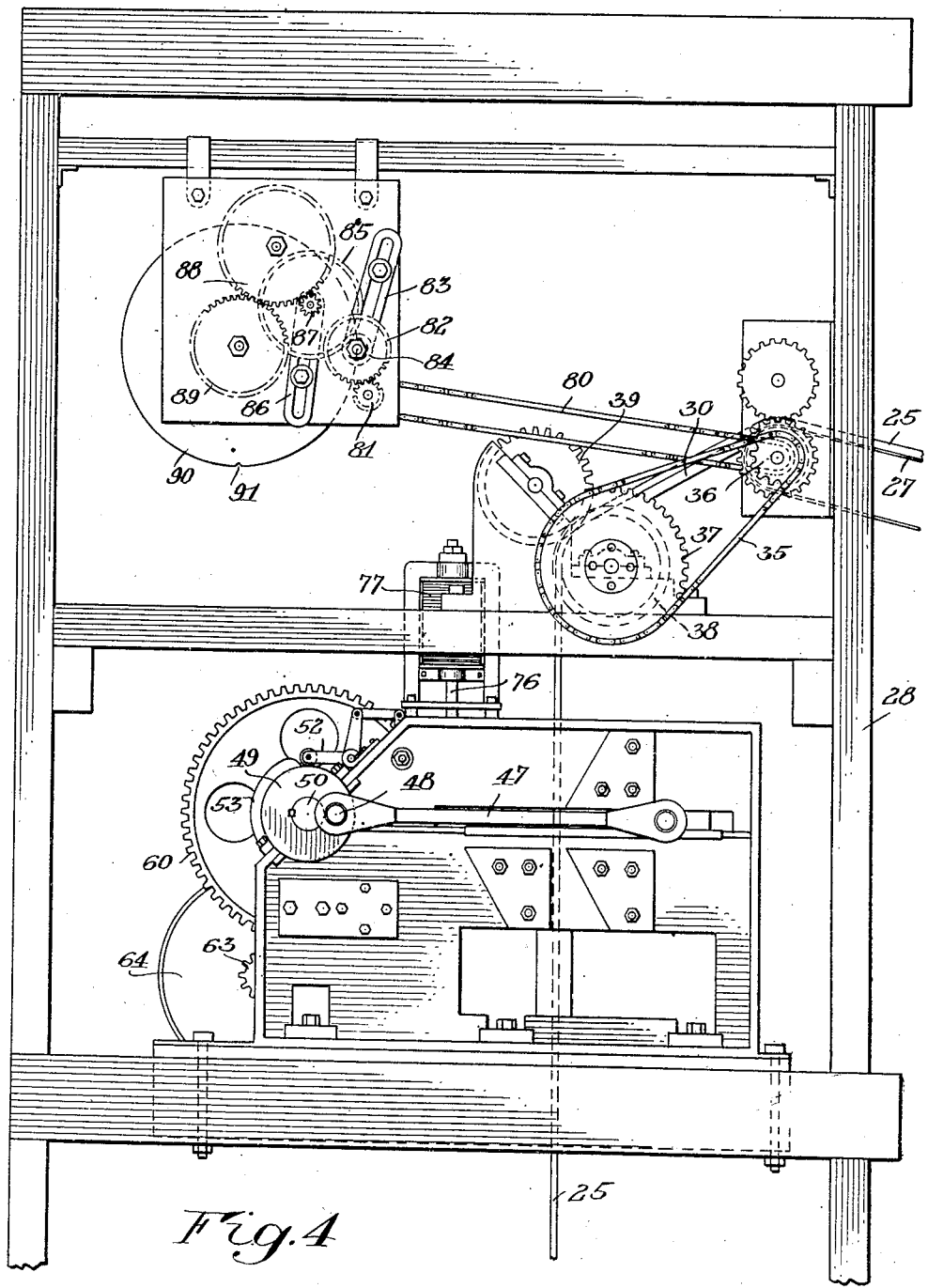
Fig. 4 is a side elevation of parts of the apparatus including the creasing rolls and the severing mechanism.

The mechanism of the present invention is designed for use in connection with insulating material of a type commonly employed for insulating the walls of buildings or the like. Such material may be formed on any suitable machine, and comprises a filling 20 (Fig. 7) of loosely associated and interlaced fibres such as cotton or jute, and liners 21 of sheet material such as kraft paper on opposite sides of the filling 20. Tapes 22 of paper or the like are preferably employed along the edges of the material within liners 21, and stitches 23 extend through the tapes and the interposed filling 20. Preferably the insulating material is formed on the machine in what might be termed a multiple width, and is then slit longitudinally to divide it into two or more strips of the desired commercial width. The batting shown in Fig. 7 is of quadruple width, and is intended to be slit along the centers of each of the three pairs of intermediate tapes 22, so as to divide the material into four strips of batting.

At the right hand portion of Fig. 1 there is illustrated the dilivery end of a bat forming machine, the finished bat 25 being shown as issuing from the feed rolls 26. The batting 25 is carried leftwardly up an inclined conveyor 27 which may be formed of spaced belts or the like as shown in Fig. 8, to a relatively high point on a framework 28. Here the conveying belts 27 pass over a roller 29 and return rightwardly, while the insulating batting 25 moves downwardly over an inclined surface 30 and between a pair of creasing rolls 31 and 32. Each of these rolls has a projecting flange 33 and, diametrically opposite therefrom, a recessed member 34 intended to cooperate with the projection 33 of the other roll, in the manner best shown in Fig. 6, in order to crease the insulating material. Thus the material will be creased at intervals, alternately in opposite directions.

It will be noted from Figs. 5 and 6 that although the creasing rolls will grip the insulating material tightly between them at the instant of creasing, yet during the remainder of the rotation of these rolls, the free space between them is wider than the thickness of the insulating material so that the material is free to slide between the rolls. This is very advantageous because it is not necessary to drive the rolls at the same speed as the travel of the insulating material. The rolls may be driven, if desired, slower than the travel of the insulating batting, and thus the creases in the batting may be formed at intervals farther apart than the semi-circumference of the rolls. This permits the rolls to be made of smaller diameter for a given interval of creasing than could be done if the rolls gripped the batting during the entire rotation.

These creasing rolls 31 and 32 are preferably driven from the roller 29 as by means of a chain 35 (Figs. 4 and 8) driven by a sprocket 36 on the shaft of the roller 29 and driving a sprocket 37 on the shaft of the roll 31. A spur gear 38 on the roll 31 meshes with a similar spur gear 39 on the roll 32 so that these rolls are operatively connected to each other to rotate perfectly in step, and the projection 33 of each roll will always cooperate exactly with the depression 34 of the other roll.

From the creasing rolls, the batting 25 passes downwardly substantially vertically to be swatched. Severing mechanism is provided for cutting the material into appropriate lengths, and this severing mechanism preferably acts upon the batting while it passes downwardly in this substantially vertical position, so that after the strip has been severed, the free portion thereof may fall downwardly by gravity. This permits the last few feet of batting in each swatched package to be delivered rapidly by gravity after the severing operation takes place, so that the swatching of the package may be completed and the package may be removed quickly without interfering with the next succeeding length of material which is meanwhile being fed downwardly somewhat slower than the severed piece falls by gravity.

The severing mechanism may be of any convenient kind and the precise details thereof need not be described here, as they are fully disclosed in and form the subject matter of a copending application of Otto R. Winter, Serial No. 422,686, filed January 22, 1930, for sheet severing mechanism.

The severing mechanism comprises, in general, a stationary knife element 45 adjacent the path of travel of the insulating material 25, and a movable knife element 46 connected at its ends to pull-rods 47 which are attached to crank-pins 48 on disks 49 fixed to a shaft 50. As the shaft rotates, the crank-pins 48 will pull leftwardly upon the rods 47, when viewed as in Figs. 4 and 5, and this will result in drawing the movable knife element 46 leftwardly into cooperation with the fixed knife 45 to sever the material. During the actual severing operation, the batting is clamped in stationary position by a clamping bar 51 operated through suitable levers and rods from a bellcrank 52 actuated by a cam disk 53 fixed to the shaft 50.

The severing mechanism is arranged to be operated automatically in predetermined timed relation to the travel of the insulating batting 25, so that the strip of batting is cut into definite predetermined lengths, which are preferably of uniform length. To this end, the severing mechanism is driven and controlled as follows:

Referring to Figs. 9 to 12 inclusive, a gear 60 is mounted to rotate freely on the shaft 50, and is driven by suitable reducing gearing such as the pinion 61 and gear 62, from a pinion 63 on any suitable power shaft such as the armature shaft of an electric motor 64. This driven gear 60 is provided with clutch jaws 65 arranged to cooperate with complementary clutch jaws 66 on a sleeve 67 splined to the shaft 50 so that it is nonrotatably secured thereto but free to move longitudinally on the shaft.

Springs 68 normally tend to move the sleeve 67 leftwardly, when viewed as in Figs. 9 and 10, to close the clutch, but such leftward movement is normally prevented, as shown in Fig. 9, by a locking pin 69 which projects into the path of a shoulder 70 on the sleeve. This shoulder 70 is wide at the point which is normally in contact with the pin 69 when the severing mechanism is stationary, and is narrow at a point diametrically opposite therefrom, as plainly shown in Figs. 9 and 10, and a gradual incline connects the wide portion to the narrow portion, as shown.

The locking pin 69, as best seen in Figs. 11 and 12, is actuated by a lever 75 operated by a rod 76 connected to the core of a solenoid 77. When the solenoid is energized, the rod 76 is elevated, which depresses the locking pin 69 and permits the springs 68 to move the sleeve 67 to bring the clutch jaws 66 into cooperation with the clutch jaws 65. The rotating gear 60 is thus connected to the shaft 50 through the clutch, and causes the shaft to rotate, which operates the movable knife 46.

The solenoid 77 is energized only momentarily, and when it is again de-energized, the locking pin 69 tends to rise once more to its initial position. When the shaft 50 has rotated aproximately half a revolution from its original position, the pin 69 is permitted to rise because the shoulder 70 at this point is relatively narrow, and as the rotation of the shaft continues the pin 69 acting upon the inclined portion of the shoulder 70 gradually forces the sleeve 67 rightwardly so that the clutch is finally disconnected or opened at the end of one complete revolution. Then when the solenoid 77 is next energized, another complete revolution of the shaft 50 and an actuation of the severing mechanism will result.

In order to have the severing mechanism operate at definite intervals with respect to the insulating batting, the energizing of the solenoid 77 is controlled from the batting conveyor 27. As the creasing rolls 31 and 32 are also operatively connected to the conveyor, it follows that the severing mechanism will operate in predetermined relation to the creasing mechanism, so that the parts may be adjusted to cause the severing to take place exactly on the creased lines or at any desired point with relation to the creased lines.

The control of the severing mechanism preferably includes a chain 80 driven by a suitable sprocket attached to the conveyor roller 29, which chain drives a sprocket connected to a pinion 81 (Figs. 4 and 8) which drives a gear 82 juornalled in an adjustable bracket 83. A pinion 84 on this gear 82 meshes with a gear 85 journalled on another adjustable bracket 86, while a pinion 87 fixed to this gear drives the gear 88 which meshes with a gear 89 fixed to a disk 90 having a V-shaped notch 91 in the periphery thereof.

Referring now to Figs. 13 and 14, a lever 92 pivoted at 93 has a projection 94 arranged to ride on the periphery of the disk 90 and to drop into the notch 91 thereof whenever this notch comes opposite the projection 94. Since this notch is V-shaped, the projection will again ride out of the notch upon further rotation of the disk. A mercury switch 95 is mounted on the lever 92 in such position that when the projection 94 of the lever is on the main peripheral portion of the disk 90, the switch will be open. When the projection 94 of the lever drops into the notch 91, however, the mercury within the switch 95 will close the switch and complete the circuit betwen the conductors 96 and 97 which lead to the switch from a relay box 98. When this circuit 96, 97 is closed, the relay within the box 98 will close the main circuit 99 which leads to the solenoid 77, and thus the solenoid will be energized to cause an operation of the severing mechanism. Almost immediately, however, the circuit will be opened again by the continued rotation of the disk 90.

As stated above, the gears 82 and 85 are journalled in the adjustable brackets 83 and 86, which permits these gears to be removed and replaced by other gears of different sizes, whenever it is desired to vary the timing of the severing mechanism in order to vary the length of the strip which is severed. The gearing for driving the disk 90 constitutes, in other words, adjustable reducing gearing so that one complete revolution of this disk may be made to correspond to any desired length of insulating batting, within reasonable limits.

After the insulating batting 25 passes downwardly between the severing elements 45 and 46 which are operated and controlled as described above, the batting is swatched. The term "swatched" as used in this specification and in the claims means folded back and forth, first in one direction and then in another, somewhat like the pleats of an accordion or of a camera bellows. The folds of the swatched material are plainly shown in Figs. 1 and 2.

Guide means is provided for guiding the edges of the folds of material during swatching. Such guide means may comprise a vertical wall 105, formed by slats or the like, on one side of the material being swatched, and a movable gate 106 on the opposite side thereof, which movable gate normally hangs vertically as shown in Fig. 2, to form a guide for the edges of the folds opposite the member 105. The gate is pivoted at 107 to the supporting frame 108, so that it may be swung to an ineffective position to permit removal of a completed package of swatched material. The pivots or hinges 107 are above the top of a completed package as shown in Fig. 2, so that the gate may be swung upwardly and outwardly to the dotted line position indicated at 106a, permitting the package of swatched material to be moved laterally beneath the gate, after which the gate may fall to its normal or effective position in which it may be latched by any suitable means.

During the swatching operation, the folds of material preferably rest upon and are supported by a piece 109 of cardboard or the like, which rests upon rollers 110. Antifriction conveying means such as rollers 111 extend laterally on a slightly downward incline from the guiding means 105 and 106, as shown in Fig. 1, and lead to a packing table 112. When a length of insulating batting has been completely swatched, the gate 106 is raised to the position 106a, and the insulating material is moved outwardly through the open gate over the rollers 110 on to the rollers 111, by means of which it is easily and rapidly moved to the packing table 112, the cardboard 109 forming a stiff support riding easily over the rollers. At the packing table 112, the swatched material may be placed in boxes or otherwise packed for shipment. The gate 106, being pivoted above the top of the package of material, together with the roller conveying means, furnishes a simple and convenient arrangement for removing a completed package quickly so as to make room for the next succeeding length of batting to be swatched. It must be remembered that the batting is being fed forwardly continuously from the machine on which it is formed, and a completed package must be removed without delay in order to make way for the descending material which is fed downwardly without interruption.

In operation, the material 25 is creased by the rolls 31 and 32 so that it folds easily at the desired points and swatches itself practically automatically, with slight manual assistance if necessary. At predetermined intervals, the rotation of the disk 90 closes the switch 95 to energize the solenoid 77 and to actuate the movable knife 46, so that the batting is severed. The severed portion immediately drops downward rapidly by gravity so that the last few folds of the package may be swatched quickly and the package may be removed while the forward end of the remaining material is descending from the severing mechanism to the swatching position. The removal of the completed package of swatched material through the gate 106 and over the rollers 110 and 111 has been fully described above and need not be repeated here.

It will be seen that an exceedingly simple and satisfactory arrangement has been provided, by means of which the insulating material is easily put up in the most convenient form for use. If it is desired to swatch the material into longer or shorter folds, this may be done by changing the speed of rotation of the creasing rolls 31 and 32 relative to the rate of travel of the conveyor 27 without having to change the rolls themselves. If it is desired to include a longer or shorter length of material in each package, this may be done easily by replacing the gears 82 and 85 which drive the timing disk 90. Thus the mechanism is capable of great flexibility in operation, but when once set to operate in the desired manner, it will continue to function in exactly the same way until the adjustments are purposely changed. Each package of material will contain exactly the same amount of batting, since the batting is cut automatically at definite intervals, thus avoiding any ground for dissatisfaction and complaints as to short measure, which are likely to arise when the cutting is not controlled automatically as in the present case.

While one embodiment of the invention has been disclosed, it is to be understood that the inventive idea may be carried out in a number of ways. This application is therefore not to be limited to the precise details disclosed but is intended to cover all variations and modifications thereof falling within the spirit of the invention or the scope of the appended claims.

We claim:

1. In a machine for making insulating bats, the combination with mechanism for conveying a strip of insulating batting, of means for creasing said strip alternately in opposite directions at predetermined intervals, said strip after being creased moving downwardly in a substantially vertical position to be swatched, and mechanism for severing said strip transversely while it is in such substantially vertical position.

2. In a machine for making insulating bats, the combination with mechanism for conveying a strip of insulating batting, of means for creasing said strip alternately in opposite directions at predetermined intervals, said strip after being creased moving downwardly in a substantially vertical position to be swatched, and power operated severing mechanism acting upon said strip while it is in said substantially vertical position for severing said strip into predetermined definite lengths, so that said insulating batting may be put up in swatched packages each containing a definite predetermined length of batting.

3. In a machine for making insulating bats, the combination with mechanism for conveying a strip of insulating batting, of means for creasing said strip alternately in opposite directions at predetermined intervals, said strip after being creased moving downwardly in a substantially vertical position to be swatched, and power operated severing mechanism controlled by said conveying mechanism and acting upon said strip while it is in said substantially vertical position.

4. In a machine for making insulating bats, the combination with conveying mechanism for feeding a strip of insulating batting at a predetermined speed, of a pair of creasing rolls for creasing said strip alternately in opposite directions so that it may be swatched, said strip being gripped by said rolls during an actual creasing operation and being free of said rolls between successive creasing operations, and means for rotating said rolls at a peripheral speed less than said predetermined speed of said insulating batting.

5. In a machine for making insulating bats, the combination with conveying mechanism for feeding a strip of insulating batting to position to be swatched, of mechanism for severing said strip into definite substantially uniform lengths, and guide means for guiding said strip during swatching, said guide means including a member pivoted above the top of a swatched length of batting so that said member may be swung upwardly and outwardly about its pivot to permit removal of said swatched batting.

6. In a machine for making insulating bats, the combination with conveying mechanism for feeding a strip of insulating batting to position to be swatched, of mechanism for severing said strip into definite substantially uniform lengths, guide means for guiding said strip during swatching, said guide means including a gate for holding one side of a length of swatched batting as the swatching progresses, and roller means extending laterally from said guide means, said gate being shiftable to an ineffective position to permit a swatched length of batting to be shifted laterally from said guide means along said roller means to make way rapidly for a succeeding length of batting to be swatched.

CHARLES A. UPSON.
OTTO R. WINTER.